S. C. HOEY.
CONTROL APPARATUS.
APPLICATION FILED JUNE 19, 1917.

1,303,317.

Patented May 13, 1919.
3 SHEETS—SHEET 1.

WITNESSES:
R. J. Fitzgerald
W. R. Coley

INVENTOR
Samuel C. Hoey.
BY
Wesley G. Carr
ATTORNEY

S. C. HOEY.
CONTROL APPARATUS.
APPLICATION FILED JUNE 19, 1917.

1,303,317.

Patented May 13, 1919.
3 SHEETS—SHEET 2.

WITNESSES:
A. J. Fitzgerald.
W. R. Coley

INVENTOR
Samuel C. Hoey.
BY
Wesley G. Carr
ATTORNEY

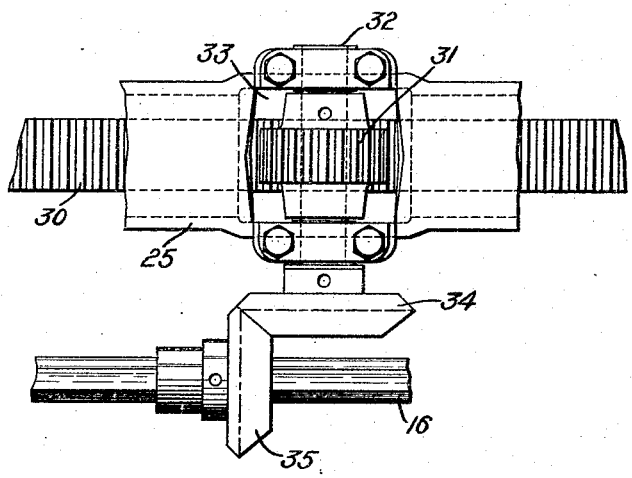
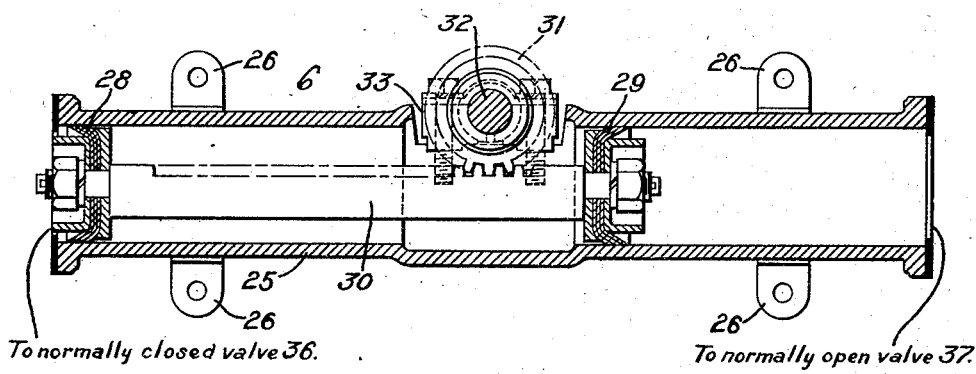

UNITED STATES PATENT OFFICE.

SAMUEL C. HOEY, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL APPARATUS.

1,303,317.  Specification of Letters Patent.  Patented May 13, 1919.

Application filed June 19, 1917. Serial No. 175,591.

*To all whom it may concern:*

Be it known that I, SAMUEL C. HOEY, a citizen of the United States, and a resident of Wilkinsburg, in the county of Allegheny and State of Pennsylvania, have invented a new and useful Improvement in Control Apparatus, of which the following is a specification.

My invention relates to control apparatus and especially to controllers of the drum type that are actuated by power devices.

The object of my invention is to provide a relatively compact combined apparatus of the above-indicated character, wherein a fluid-pressure-operated actuating apparatus, for example, is located within the common controller-incasing means and operates transversely to the direction of movement of the control drum.

More specifically stated, it is the object of my invention to provide a drum-type controller and a power-operated actuating apparatus therefor extending substantially parallel to the axis of the drum, and power-transmitting means, preferably in the form of meshing bevel gear-wheels, for operatively connecting the apparatus to the drum.

Heretofore, combined apparatus of the type under consideration has involved the use of fluid-pressure-operated apparatus, or the equivalent, that has been located upon one end of the controller and has operated in the same direction as the drum. The resultant structure has, in general, been of a non-compact, rather unsightly T-shaped appearance which has entailed considerable additional time and labor during both the manufacture and installation of the apparatus and also in the subsequent operating maintenance thereof.

According to my present invention, the drum controller and the power apparatus, of substantially cylindrical general shape, are located side-by-side within a controller case of a regular rectangular form and thus the entire apparatus requires a minimum amount of mounting space, is neat and compact in appearance, and is readily accessible for inspection and maintenance by merely removing the front incasing member of the type that is usually employed in connection with the well-known "K" controllers.

Figure 1:
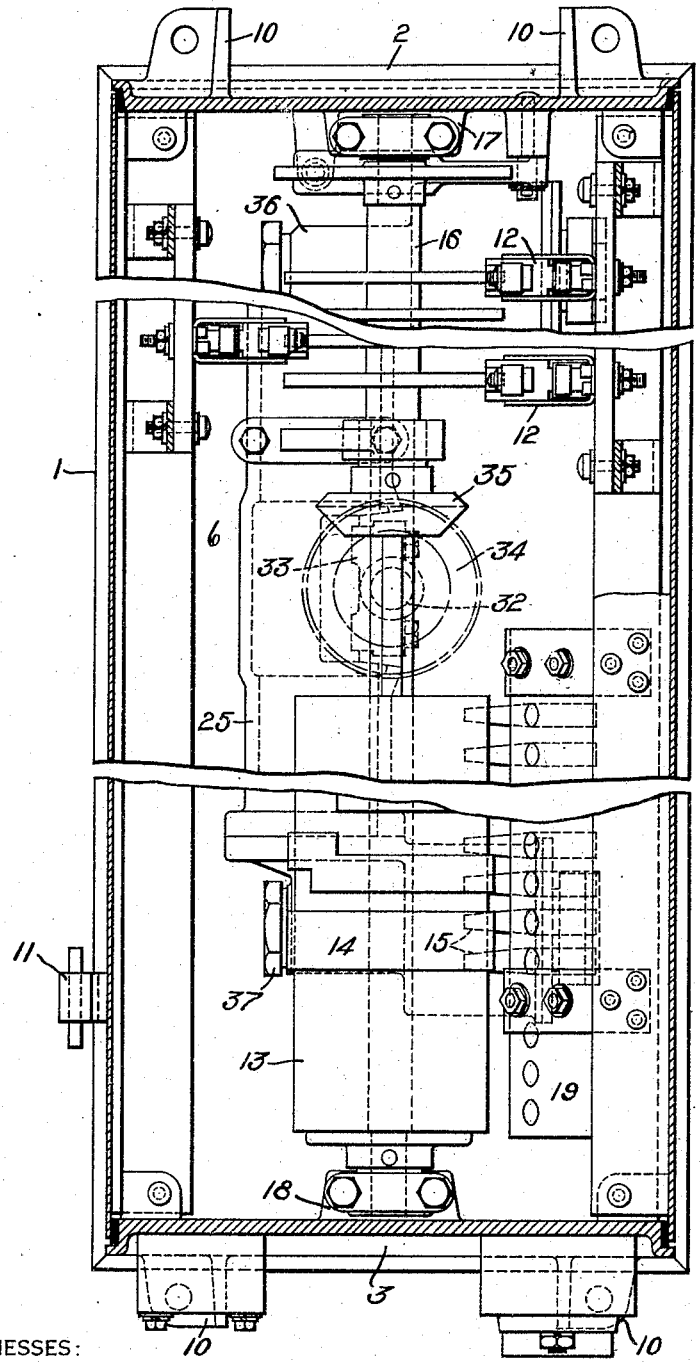
Figure 2:
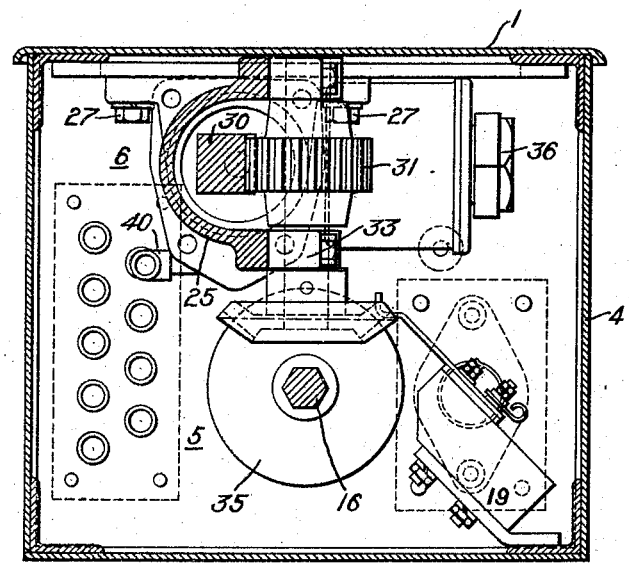

My invention may best be understood by reference to the accompanying drawings, wherein Figure 1 is a view, in front elevation with the front incasing member removed, of a combined control apparatus constructed in accordance with my present invention; Fig. 2 is a view, partially in transverse section and partially in end elevation, of the apparatus shown in Fig. 1; Fig. 3 is a detail plan view of a portion of the operating mechanism for my combined apparatus; and Fig. 4 is a partial view, in longitudinal section, taken at right angles to the view of Fig. 1 and illustrating further details of the power-operated actuating apparatus that is preferably employed in the present invention.

Referring to Fig. 1 and Fig. 2, the apparatus shown comprises a suitable incasing means, preferably of a well-known type having a flat back or base 1, top and bottom cover members 2 and 3 which may or may not be integral with the base, and a combined front-and-side cover member 4 of rectangular shape that serves, in conjunction with the base 1 and the top and bottom cover members 2 and 3, to completely incase the combined apparatus, thus forming a neat and simple controller box which has no protruding or irregular external sections. The controller also includes a rotatable member or drum 5 for the purpose of making and breaking any desired main and auxiliary control circuits, and a power-operated actuating apparatus 6 for the control drum 5.

The top and bottom cover members 2 and 3 are provided with suitable apertured lugs or ears for the usual purpose of permitting mounting of the control apparatus, as a whole, underneath the car floor or in any other desirable location. The front incasing member 4 is readily detachable, as is customary, being latched to the base 1 by any suitable means, a portion of which is shown by 11, Fig. 1.

The rotatable control member 5 may be of any well-known type and is shown as comprising a plurality of sets of coöperative stationary and movable main-circuit contact members 12 of the cam-operated type, which are located in one-half of the controller and a drum member 13 that is positioned in the other half of the controller and is provided with a plurality of contact segments 14 for the purpose of engaging a set of stationary control fingers 15 in any desired sequence. The movable elements of the several sets of contact members are all suitably mounted upon a longitudinally-extending shaft 16, the ends of which are carried in suitable bearings or journals 17 and 18 that are mounted upon the cover members 2 and 3 respectively. The control fingers 15 may be mounted upon a suitable stationary finger base 19. Inasmuch as the particular type of control member that is employed is immaterial to my present invention, I do not wish to be limited to either or both of the forms illustrated, as my invention is applicable to any type of control member or other element that is rotatable. Consequently, I do not deem it necessary, for the purposes of the present invention, to further describe the rotatable control member.

The power-operated actuating apparatus 6 for the control member 5 may be of any suitable type and is shown as comprising an operating cylinder 25 that is provided with a plurality of apertured side lugs 26, by means of which the cylinder may be secured to the base 1 through the agency of bolts 27, for example. A pair of pistons 28 and 29, that normally occupy the positions illustrated in Fig. 4, are rigidly connected by a rack member 30 which meshes with a pinion 31, the shaft 32 of which is mounted in a suitable bearing block 33 that is bolted or otherwise secured to the frame of the cylinder 25.

For the purpose of transmitting power from the actuating apparatus 6 to the rotatable control member, a bevel gear-wheel 34 is mounted upon the pinion shaft 32 and is adapted to mesh with a coöperating bevel gear-wheel 35 which is rigidly secured to the longitudinally-extending main controller shaft 16.

Thus, the actuating apparatus 6 extends substantially parallel to the axis of the control member 5, and the rack 30 and coöperating pistons 28 and 29 move in the same direction. Such movement of the rack member is transmitted through the pinion 31 and the bevel gear-wheels 34 and 35 to the controller shaft 16, whereby the control member 5 is operated in the usual manner.

For the purpose of controlling the application of fluid pressure from any suitable source (not shown) through a pipe or other inlet 40 to the outer ends of the cylinder 25, electrically-controlled valve members 36 and 37 communicate with the respective cylinder ends. The valve 36 is normally closed to prevent the access of fluid pressure to the cylinder 25, while the other valve 37 is normally open to admit fluid pressure to the corresponding end of the cylinder, whereby the actuating apparatus 6 and the control member 5 are biased to the illustrated positions. By suitable energization of the electrically-controlled valves 36 and 37, the pistons 28 and 29 may be caused to move in the one or the other direction, dependent upon the will of the train operator or other conditions, as will be understood.

Since the particular type of power apparatus that is employed is irrelevant to the present invention, I have not deemed it necessary to further illustrate the well-known actuating apparatus just described, a complete account of which is contained in Patent No. 1,229,543, granted June 12, 1917, to the Westinghouse Electric and Manufacturing Company on an application filed by N. W. Storer and A. J. Hall.

I have thus provided a compact and readily accessible control apparatus, of neat and regular external appearance, comprising a rotatable contact-making-and-breaking member and an actuating mechanism therefor that extends and operates substantially parallel to the axis of the rotatable control member.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. In a controller, the combination with incasing means, of a movable control member and a power-operated actuating apparatus therefor located within said incasing means transversely to the direction of movement of said control member.

2. In a controller, the combination with incasing means, of a rotatable control member and an actuating apparatus therefor located within said incasing means substantially parallel to the axis of said member.

3. In a controller, the combination with incasing means, of a rotatable control member and a power-operated actuating apparatus therefor located with said incasing means substantially parallel to the axis of said member and adapted to be remotely controlled.

4. In a controller, the combination with incasing means, of a rotatable control member, a power-operated apparatus located within said incasing means and having a direction of movement transverse to that of said member, and power-transmitting means interposed between said apparatus and said member.

5. In a controller, the combination with incasing means, of a rotatable control member, a power-operated apparatus located within said incasing means and having a direction of movement transverse to that of said member, and a plurality of meshing bevel gear-wheels respectively secured to said apparatus and to said member.

6. In a controller, the combination with incasing means, of a rotatable control member and an electrically-controlled, fluid-pressure-operated actuating apparatus therefor located within said incasing means transversely to the direction of movement of said member.

7. In a controller, the combination with incasing means, of a rotatable control member and a fluid-pressure-operated actuating apparatus therefor located within said incasing means substantially parallel to the axis of said member.

8. In a controller, the combination with incasing means, of a rotatable control member, an electrically-controlled, fluid-pressure-operated actuating apparatus therefor located within said incasing means transversely to the direction of movement of said member, and power-transmitting means interposed between said apparatus and said member.

9. In a controller, the combination with incasing means, of a rotatable control member, a fluid-pressure-operated actuating apparatus therefor located within said incasing means substantially parallel to the axis of said member, and power-transmitting means interposed between said apparatus and said member.

10. In a controller, the combination with incasing means, of a rotatable control member, an electrically-controlled, fluid-pressure-operated actuating apparatus therefor located within said incasing means transversely to the direction of movement of said member, and a plurality of meshing bevel gear-wheels respectively secured to said apparatus and to said member.

11. In a controller, the combination with incasing means, of a rotatable control member, a fluid-pressure-operated actuating apparatus therefor located within said incasing means substantially parallel to the axis of said member and comprising a meshing rack member and pinion member, and a plurality of meshing bevel gear-wheels respectively secured to said pinion member and to said member.

12. In a controller, the combination with a rotatable control member, an electrically-controlled, fluid-pressure-operated actuating apparatus therefor located and operative transversely to the direction of movement of said member, and power-transmitting means interposed between said apparatus and said member.

13. In a controller, the combination with a rotatable control member, an electrically-controlled, fluid-pressure-operated actuating apparatus therefor located and operative transversely to the direction of movement of said member, and a plurality of meshing bevel gear-wheels respectively secured to said apparatus and to said member.

In testimony whereof, I have hereunto subscribed my name this 31st day of May, 1917.

SAMUEL C. HOEY.

Copies of this patent may be obtained for five cents each, by addressing the "Commissioner of Patents, Washington, D. C."